A. G. FLICKINGER.
COMBINED ENGINE BRAKE AND STARTER.
APPLICATION FILED FEB. 23, 1915.
1,167,284. Patented Jan. 4, 1916.
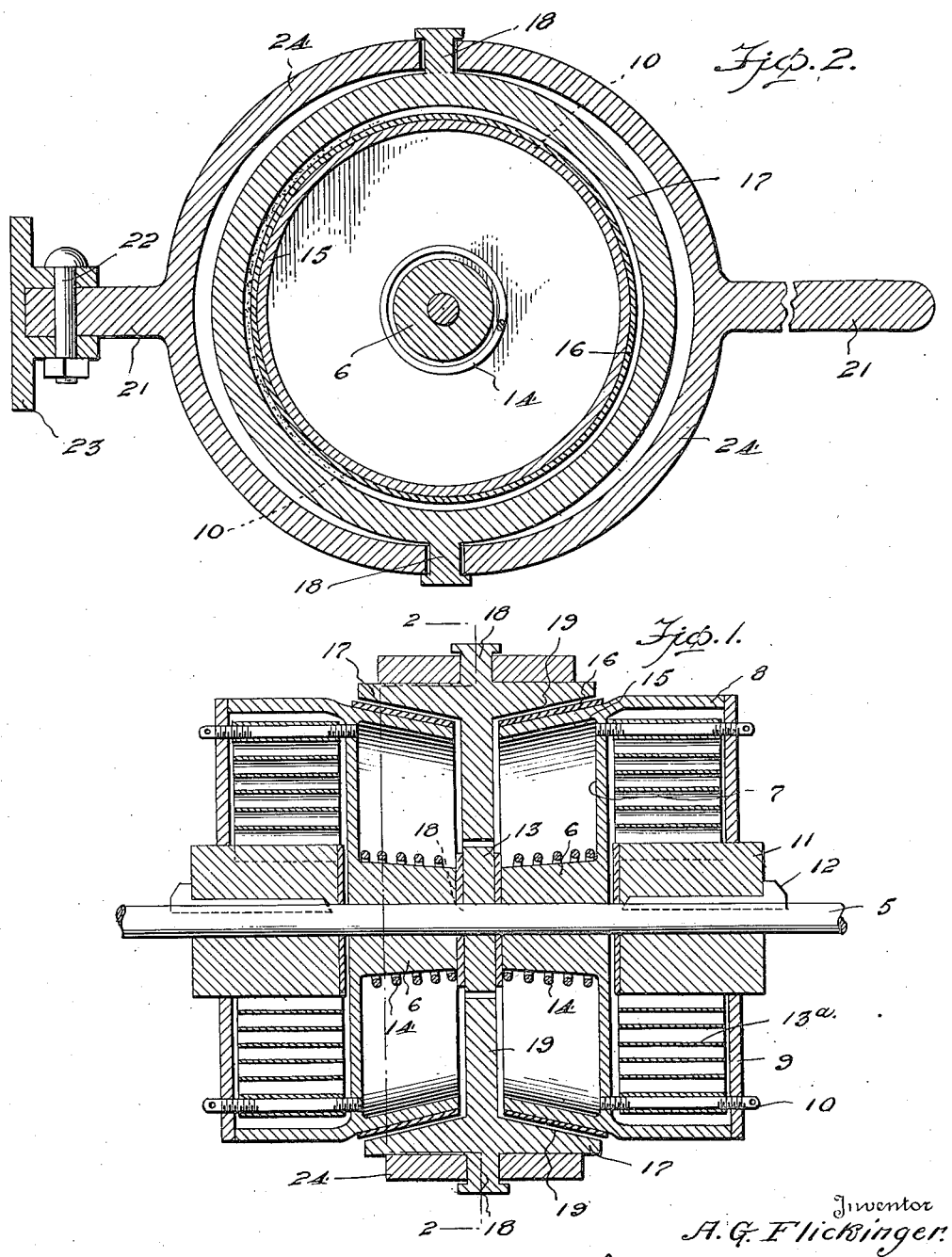

UNITED STATES PATENT OFFICE.

ANDREW G. FLICKINGER, OF VALLEJO, CALIFORNIA.

COMBINED ENGINE BRAKE AND STARTER.

1,167,284.  Specification of Letters Patent.  Patented Jan. 4, 1916.

Application filed February 23, 1915. Serial No. 10,012.

*To all whom it may concern:*

Be it known that I, ANDREW G. FLICKINGER, a citizen of the United States, residing at Vallejo, in the county of Solano and State of California, have invented certain new and useful Improvements in Combined Engine Brakes and Starters; and I do hereby declare the following to be a full, clear, and exact description of the invention, such as will enable others skilled in the art to which it appertains to make and use the same.

This invention relates to a combined engine brake and starter especially designed for use in connection with reversible types of gas engines.

The invention has for its object to provide a device including a manually operable brake for stopping the rotational movement of the engine shaft and springs one or the other of which is wound by the engine shaft simultaneously with the application of the brakes, and, when the shaft comes to a stop, automatically starts the shaft to rotate in the opposite direction.

With this and other objects in view, the invention consists in the novel construction, arrangement and formation of parts as will be hereinafter specifically described, claimed and illustrated in the accompanying drawing, in which:

Figure 1 represents a longitudinal sectional view through the combined engine brake and starter. Fig. 2 represents a transverse sectional view on the line 2—2 of Fig. 1.

Referring to the drawing in detail, wherein similar reference numerals designate corresponding parts throughout the several views, the numeral 5 indicates an engine or other shaft on which is rotatably mounted a pair of spaced rotatable hubs 6 formed integral with plates 7 constituting the inner side walls of spring housings or casings 8, the outer ends of which latter are open. The outer sides of the casings 8 are closed by removable plates 9 secured to the inner side walls 7 by bolts 10, or equivalent means. Each closure plate 9 is formed with an enlarged central opening receiving a sleeve 11 non-rotatably secured to the shaft 5 by a key 12. Oppositely wound spiral springs 13ª are arranged in the casings 8 and are secured at their outer ends to said casings and at their inner ends to the shaft 5. An annular spacing element 13 is rotatably mounted upon the shaft 5 intermediate the hubs 6, and said hubs, together with the casings 8 are normally retained in spaced relation by springs 14 coiled about the hubs 6.

Each casing 8 carries an integral and inwardly projecting frusto-conical flange 15 on which is secured an external facing 16. The oppositely inclined frusto-conical flanges 15 constitute brake drums and are adapted to coöperate with the brake ring 17 having a pair of diametrically opposed trunnions or pins 18 upon its outer surface and an inwardly directed flange or web 19 upon its inner surface disposed between and spaced from the adjacent edges of the two drums 15. The inner surfaces 19 of the brake ring are oppositely inclined so as to conform with the oppositely disposed frusto-conical flanges or drums 15.

A brake lever 21 is pivotally mounted at 22 in a suitable support 23 and is formed intermediate its ends with an annular hollow enlargement 24, which encircles the brake ring 17 and is formed with diametrically opposed openings pivotally receiving the trunnions 18, whereby the brake ring 17 may be moved laterally from engagement with one of the brake drums 15 into engagement with the other. In its normal position, as illustrated in Fig. 1, the lever 21 retains the brake ring 17 in inoperative position or spaced from both of the brake drums 15.

In use, when it is desired to stop the forward or reverse rotational movement of the shaft 5 and the engine (not shown) connected therewith, the brake lever 21 is swung laterally, moving one of the surfaces 19 into frictional engagement with one of the casings 16 of the brake drum 15, thus locking the brake drum together with the spring casing 8 associated therewith against rotation. The momentum of the shaft 5 causes the spring 13ª in the non-rotatable casing 8 to wind and the constantly increasing resistance of the spring, as it is being wound, gradually reduces the speed of the shaft 5 and finally stops it. After the shaft 5 has been stopped and the brake lever 21 is held so as to lock the drum 15 and casing 8 associated therewith against rotation, the tension of the spring 13ª within said casing starts the shaft 5 to rotate in the opposite direction, thus starting the gas or other engine (not shown). After the spring 13ª has unwound the lever 21 is moved to neutral or inoperative position out of engagement with the facing 16, thus permitting the drum 15, casing 8 and parts associated therewith to rotate with the shaft 5.

What I claim is:

1. A device of the character described comprising a shaft, a pair of brake drums rotatably mounted on said shaft, a brake ring adapted to coöperate with said brake drums, a lever carried by said brake ring, and a pair of oppositely wound spiral springs secured at their inner ends to said shaft and at their outer ends to said drum.

2. A device of the character described comprising a shaft, a brake drum including a hub rotatably mounted on said shaft, a spring casing formed integral with said brake drum, a brake ring, a lever connected with said brake ring, a spring secured in said casing and to said shaft and a closure plate removably secured over said spring casing.

3. A device of the character described comprising a shaft, a pair of brake drums rotatably mounted on said shaft, means normally retaining said brake drums in spaced relation, a brake ring, a lever connected with said brake ring for moving the latter into frictional engagement with either of the brake drums, and springs connecting each of the brake drums with said shaft.

4. A device of the character described comprising a shaft, a pair of brake drums rotatably mounted on said shaft, a spacing element interposed between said brake drums, means normally tending to move said brake drums apart, spring casings formed integral with said drums, and springs disposed within said spring casings and secured at opposite ends to said casings and said shaft, and a brake ring adapted to frictionally engage either of said brake drums.

5. A device of the character described comprising a shaft, a pair of oppositely disposed frusto-conical brake drums rotatably mounted on said shaft, means normally retaining said drums in spaced relation, spring casings formed integral with said drums, springs disposed in said casings secured at one end to said casings and at the opposite ends to said shaft, a brake ring having oppositely inclined inner surfaces, and a pivoted lever pivotally connected with said brake ring.

6. A device of the character described comprising a shaft, a pair of oppositely disposed brake drums rotatably mounted on said shaft, means for normally retaining said brake drums in spaced relation, spring casings formed integral with said brake drums, oppositely wound spiral springs arranged in said casings secured at their outer ends to said casings and at their inner ends to said shaft, a brake ring having oppositely inclined inner surfaces adapted to frictionally engage said brake drums, and a brake lever pivotally connected with said brake ring.

In testimony whereof I affix my signature in presence of two witnesses.

ANDREW G. FLICKINGER.

Witnesses:
 HARRY M. REED,
 LOUIS T. KELLEY.